(12) United States Patent
Steinert (10) Patent No.: US 10,948,305 B1
(45) Date of Patent: Mar. 16, 2021

(54) DRIVING ASSISTANCE SYSTEMS AND METHODS

(71) Applicant: United Services Automobile Association (USAA), San Antonio, TX (US)

(72) Inventor: Shane Michael Steinert, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 115 days.

(21) Appl. No.: 16/204,312

(22) Filed: Nov. 29, 2018

Related U.S. Application Data

(60) Provisional application No. 62/592,899, filed on Nov. 30, 2017.

(51) Int. Cl.
*G01C 21/34* (2006.01)

(52) U.S. Cl.
CPC ..... *G01C 21/3461* (2013.01); *G01C 21/3415* (2013.01); *G01C 21/3492* (2013.01)

(58) Field of Classification Search
CPC .................................................. G01C 21/3461
See application file for complete search history.

(56) References Cited

U.S. PATENT DOCUMENTS

| | | | | |
|---|---|---|---|---|
| 2008/0162034 | A1* | 7/2008 | Breen | G01C 21/3461 701/533 |
| 2016/0061625 | A1* | 3/2016 | Wang | G08G 1/012 701/454 |
| 2017/0292848 | A1* | 10/2017 | Nepomuceno | G01C 21/3492 |
| 2019/0283745 | A1* | 9/2019 | Nagel | B60W 40/09 |

* cited by examiner

*Primary Examiner* — Anne Marie Antonucci
*Assistant Examiner* — Abdalla A Khaled
(74) *Attorney, Agent, or Firm* — Fletcher Yoder P.C.

(57) ABSTRACT

A tangible, non-transitory machine-readable medium includes machine-readable instructions that, when executed by one or more processors, cause the one or more processors to receive a plurality of data inputs from one or more databases, determine a plurality of geofences based at least in part on the plurality of data inputs, and determine a plurality of scores based at least in part on the plurality of data inputs. Each score of the plurality of scores is associated with a geofence of the plurality of geofences. The machine readable instructions, when executed by the one or more processors, also cause the one or more processors to generate a model comprising the plurality of geofences and the plurality of scores, and to output a driving route based at least in part on the plurality of geofences and the plurality of scores.

20 Claims, 6 Drawing Sheets

FIG. 5

DRIVING ASSISTANCE SYSTEMS AND METHODS

CROSS-REFERENCE TO RELATED APPLICATION

This application claims priority to and the benefit of U.S. Provisional Application No. 62/592,899, entitled "DRIVING ASSISTANCE SYSTEMS AND METHODS," filed Nov. 30, 2017, which is hereby incorporated by reference in its entirety for all purposes.

BACKGROUND

The present disclosure relates generally to driving assistance systems and methods. More specifically, the present disclosure relates to generating a model including geofences based on historical accident data, and notifying and/or rerouting model users to enable greater awareness and avoidance of certain geofenced areas.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Route planning or guidance of a driven vehicle may be performed using a system that analyzes current road conditions to output a route to a destination. For instance, a user may input the destination into the system. Based on current traffic estimates, current reported accidents, and/or current reported road work, the system may determine the quickest and/or most direct route to the destination. However, it is presently recognized that many drivers may wish to have access to a route planning or guidance system that provides routes and/or guidance based on other factors and/or historical data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory machine-readable medium includes machine-readable instructions that, when executed by one or more processors, cause the one or more processors to receive a plurality of data inputs from one or more databases, determine a plurality of geofences based at least in part on the plurality of data inputs, and determine a plurality of scores based at least in part on the plurality of data inputs. Each score of the plurality of scores is associated with a geofence of the plurality of geofences. The machine readable instructions, when executed by the one or more processors, also cause the one or more processors to generate a model comprising the plurality of geofences and the plurality of scores, and to output a driving route based at least in part on the plurality of geofences and the plurality of scores.

In one embodiment, a tangible, non-transitory machine-readable medium comprising machine-readable instructions that, when executed by one or more processors, cause the one or more processors to receive historical accident data, determine a plurality of geofences based at least in part on the historical accident data, generate a model comprising the plurality of geofences, and output a driving route based at least in part on the plurality of geofences.

In one embodiment, a method includes receiving, at one or more processors, historical accident data. The method also includes determining, using the one or more processors, a plurality of geofences based at least in part on the historical accident data. The method further includes generating, using the one or more processors, a model comprising the plurality of geofences. The method further includes outputting, using the one or more processors, a driving route based at least in part on the plurality of geofences.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Route planning or guidance of a driven vehicle may be performed using a system that analyzes current road conditions to output a route to a destination. For instance, a user may input the destination into the system. Based on current traffic estimates, current reported accidents, and/or current reported road work, the system may determine the quickest and/or most direct route to the destination.

However, it is presently recognized that many drivers may wish to have access to a route planning or guidance system that provides routes and/or guidance based on other factors and/or historical data. For example, drivers may wish to be provided with a route, or be rerouted during travel to a route, that provides a lower probability of delays due to an accident along the route to a destination. Such driving assistance may increase awareness of or reduce travel at roads, areas, and/or times of travel that should be avoided. To provide such driving assistance, the present embodiments include a route planning or guidance system that accesses historical accident data to generate a model (e.g., map) based on clusters (e.g., accident density clusters). In some embodiments, the system may generate geofences using the clusters and assign scores to each geofenced area based on features of the historical accident data. Further, the system may use the model to provide route planning and guidance to users. Additional details regarding systems and techniques for generating and utilizing models will be discussed below with reference to FIGS. 1-6.

Figure 1:
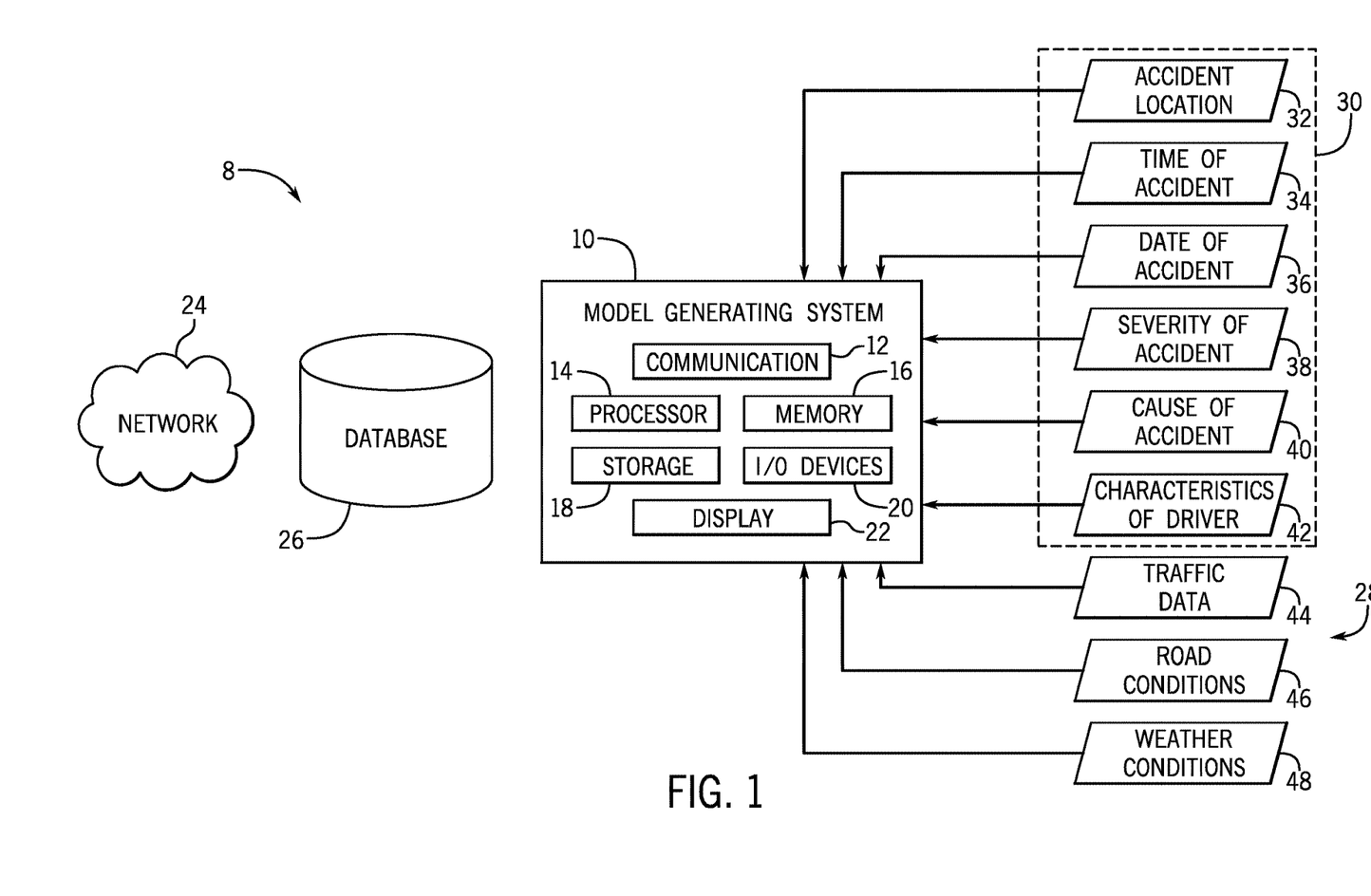
FIG. 1 illustrates a block diagram of a model generating system communicatively coupled to a number of data sources, in accordance with embodiments described herein.

With the foregoing in mind, FIG. 1 is a block diagram of a portion of a system 8 having a model generating system 10 communicatively coupled to a variety of data sources that may be used by the model generating system 10 to generate a model (e.g., map), which may be displayed (e.g., via a graphical user interface [GUI]) and utilized by drivers for route planning and/or active travel guidance. The model generating system 10 may include any suitable computing system (e.g., cloud computing system) and/or may include any suitable computer device, such as a general-purpose personal computer, a laptop computer, a tablet computer, or a mobile computer that is configured in accordance with present embodiments. The model generating system 10 may include various types of components that may assist the model generating system 10 in performing various the types of tasks and operations described herein. For example, the model generating system 10 may include a communication component 12, a processor 14, a memory 16, a storage 18, input/output (I/O) ports 20, and/or a display 22. The communication component 12 may facilitate wired or wireless communication between the model generating system 10, the data sources, and various other computing systems via a network 24. The processor 14 may be any type of computer processor or microprocessor capable of executing computer-executable code or logic. The processor 14 may also include multiple processors that may perform the operations described herein.

The memory 16 and the storage 18 may be any suitable articles of manufacture that can serve as media to store processor-executable code, data, or the like. These articles of manufacture may represent non-transitory computer-readable media (e.g., any suitable form of memory or storage) that may store the processor-executable code or logic used by the processor 14 to perform the presently disclosed techniques. It should be noted that non-transitory merely indicates that the media is tangible and not a signal. As used herein, applications may include any suitable computer software or program that may be installed onto the model generating system 10 and executed by the processor 14.

The I/O ports 20 may be interfaces that may couple to other peripheral components, such as input devices (e.g., keyboard, mouse), sensors, input/output (I/O) modules, and the like. The display 22 may operate as a human machine interface (HMI) to depict visualizations (e.g., a visual and/or interactive version of a generated model) associated with software or executable code being processed by the processor 14. In one embodiment, the display 22 may be a touch display capable of receiving inputs from a user or operator of the model generating system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the model generating system 10. It should be noted that the components described above with regard to the model generating system 10 are examples and the model generating system 10 may include additional or fewer components relative to the illustrated embodiment.

In certain embodiments, the model generating system 10 may be communicatively coupled to the network 24, which may include collections of computing systems, the Internet, an Intranet system, or the like. The network 24 may facilitate communication between the model generating system 10 and various data sources. For instance, the network 24 may be communicatively coupled to one or more databases 26, which may store data regarding historical accident claims, such as location, time, date, severity, cause of accidents, characteristics of the drivers, and/or characteristics of the vehicles involved. Such data from the database 26 may be used as inputs 28 into the model generating system 10 to generate a model. It should be appreciated that the database 26 may be communicatively coupled to the model generating system 10 via the network 24 or may be directly (e.g., via wired connection) to the model generating system 10.

Data inputs 28 into the model generating system 10 may be used by the model generating system 10 to build and update a model containing geofences and associated scores. The data inputs 28 may include, as previously mentioned, historical accident data 30 that may be stored in the database 26. The historical accident data 30 may include data about previous accidents in which insurance damage claims were filed. For example, the historical accident data 30 may include data regarding accident location 32 (e.g., latitude and longitude measurements), time of accident 34, date of accident 36, severity of accident 38, cause of accident 40 (e.g., debris, slick road, reckless driving or driver caused), characteristics of the driver or vehicle 42 (e.g., age of driver or vehicle; accident record of driver), or any combination thereof. The data inputs 28 may further include other data, such as real-time or historical traffic data 44, road condition data 46, and/or weather condition data 48, if available. The model generating system 10 may receive the real-time or historical traffic data 44, the road condition data 46 (e.g., type of road, size of road, presence of any construction on the road), and/or the weather data 48 from the database 26, the network 24, or from any other suitable source.

To generate the model, the model generating system 10 may use the historical accident data 30 to generate clusters (e.g., accident clusters, where each cluster point in each cluster represents a prior accident). Subsequently, the model generating system 10 may determine and generate geofences based on the clusters. For example, the model generating system 10 may determine and generate geofences around clusters that meet or exceed a threshold for generating a geofence. The threshold may be a particular number or density of cluster points within a particular section of road (e.g., within a half mile, within a mile, at an intersection). Further, the model generating system 10 may take into account the relative age of the cluster points within each cluster. For example, in some embodiments, a large number or recent accidents within a particular section of road may meet the threshold for generating a geofence; however, if relatively older accidents make up the majority of the cluster, that cluster may not meet the threshold for generating a geofence. In some embodiments, the threshold for generating a geofence may be based on other factors or data inputs 28. Each geofence may be a virtual geographic boundary around a respective cluster that meets or exceeds the threshold for generating a geofence.

The model generating system 10 may further determine scores, which may relate to accident probabilities, for each generated geofence. The scores may vary based on the time of day for each geofence. The scores may be based on the historical accident data 30, the real-time or historical traffic data 44, the road condition data 46, and/or the weather condition data 48. However, in some embodiments, certain types of the data inputs 28 may be weighted higher by the model generating system 10 relative to other types of the data inputs 28 for determining the score of each generated geofence. For example, in some embodiments, certain data inputs 28, such as accident location 32, time of accident 34, date of accident 36, severity of accident 38, and cause of accident 40, may be weighted more heavily for purposes of determining the score of each geofence. For example, a larger number of recent accidents may result in a higher score for one geofence, while a smaller amount of recent accidents may result in a lower score for another geofence. However, in some embodiments, other data inputs 28 may be weighted higher for purposes of determining the score.

Figure 3:
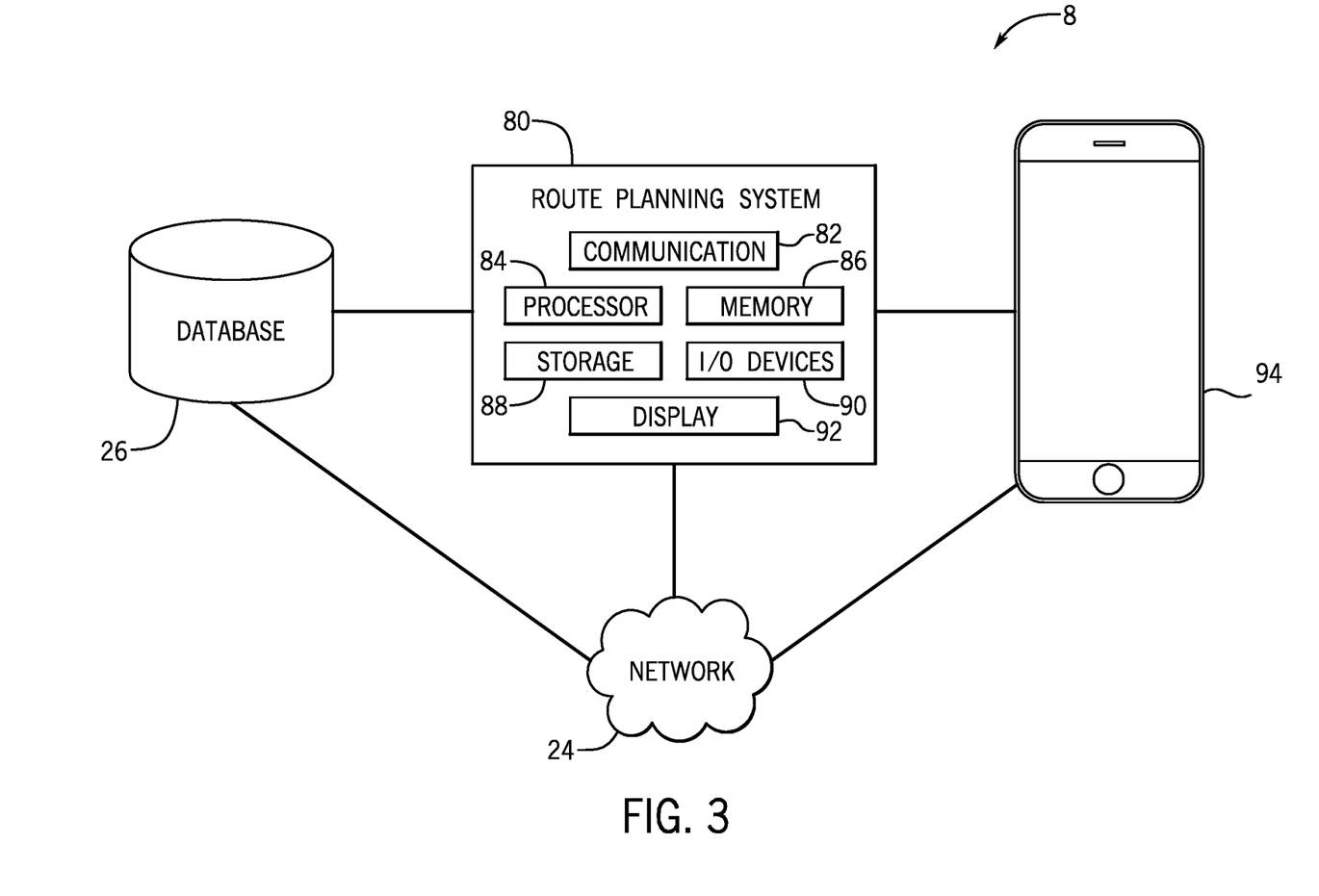
FIG. 3 illustrates a block diagram of a route planning system that may utilize the model of FIG. 2, in accordance with embodiments described herein.

The model generating system 10 may output a model showing the clusters, the geofences, and/or the associated scores for each geofenced area, as discussed in greater detail with reference to FIG. 3. The model may be used by drivers to proactively plan traveling routes to avoid certain areas and/or may be used to adjust a route while driving, as discussed in detail with reference to FIGS. 4-6. The model generating system 10 may be trained to generate the clusters, the geofences, and the associated scores. For example, different machine learning classifiers may be used to generate the geofences and determine the scores based on the clusters. The model generating system 10 may be trained to evaluate the probability of an accident within a given geofence based on the historical accident data, estimated traffic, and/or any of the other data inputs 28. Further, the model generating system 10 may be trained to compare scores of geofenced locations to determine a score differential that may then be used for route planning and active travel guidance.

The model generating system 10 may continuously receive the data inputs 28 and may update the model in order to maintain up-to-date clusters, geofences, and scores to accurately notify users of areas that should be avoided. For example, in some embodiments, older accidents (e.g., older than a predefined date) may be eliminated from consideration or given a reduced weight for the purposes of generating clusters, geofences, and associated scores. As another example, when road condition data 46 is used as a data input 28 into the model generating system 10, such conditions as construction may be completed and may cause a geofence or score on a particular road to be removed or reduced (e.g., if the construction was indicated as cause of recent accidents in that location).

Figure 2:
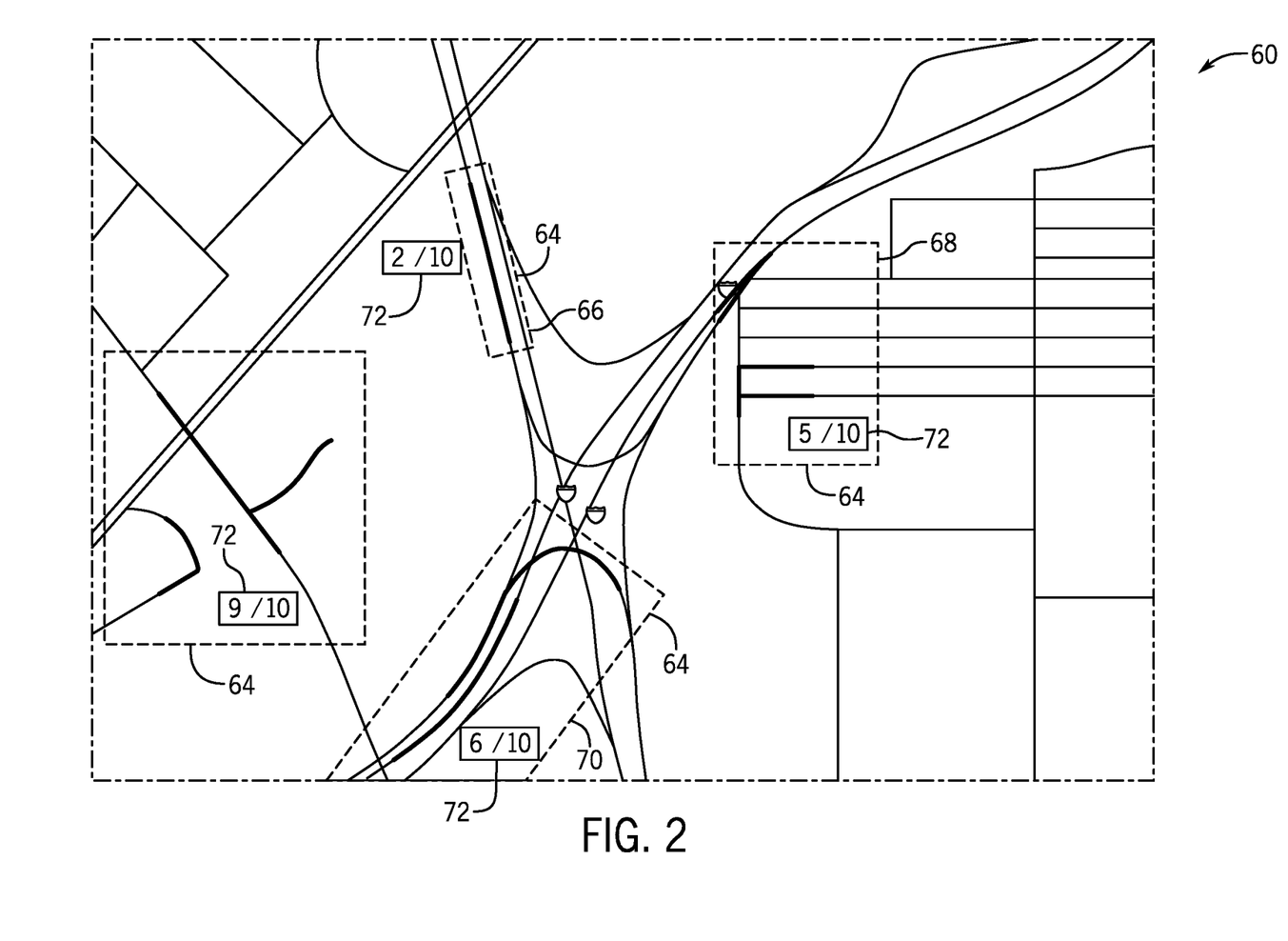
FIG. 2 illustrates a model that may be output from the model generating system of FIG. 1, in accordance with embodiments described herein.

The model generating system 10 may generate and output a model including clusters, geofences, and associated scores based on the data inputs 28, including the historical accident data 30, the real-time and/or historical traffic data 44, the road condition data 46, the weather condition data 48, or any combination thereof. With the foregoing in mind, FIG. 2 illustrates an embodiment of a model 60 (e.g., map) that may be output from the model generating system 10, including clusters and geofences 64, which may be generated based on the data inputs 28. The model 60 may be displayed via a user device (e.g., computer, tablet, mobile phone, console of a vehicle) for use in proactive route planning prior to travel and/or for active guidance during travel. As previously discussed, the model generating system 10 may receive the data inputs 28, including at least the historical accident data 30, from the database 26 or other data sources. The model generating system 10 may evaluate the historical accident data 30 to generate clusters. It should be appreciated that in some embodiments the cluster points (e.g., historical accidents) that form the clusters may be indicated on the model 60 as points plotted on the model 60 to indicate where accidents have occurred. In some embodiments, varying indications, such as varying colors or color intensity of the points, may indicate a higher density of accidents within a cluster or other characteristics of the accidents or clusters.

The model generating system 10 may then generate geofences 64 (e.g., virtual geographic boundaries) around clusters that meet the threshold for generating the geofence 64, such as a particular quantity or density of accidents within a certain section of a road or roads (e.g., half mile, mile, intersection). As previously discussed, the threshold for generating a geofence 64 may take into account the relative age of the accidents within that cluster. Further, generation of the geofences 64 may include other activation parameters, such as an approximate time of day. The approximate time, or times, of day may be determined by the model generating system 10 based on the historical accident data 30, including the time of accident 34, and/or other data inputs 28. In this manner, the geofences 64 may only be active on the model 60 during the approximate time of day. As such, the geofences 64 of the model 60 may vary throughout the day.

The geofences 64 may include a single road or section of road, such as a geofence 66, or may include multiple adjacent roads or sections of roads, such as a geofence 68. The geofence 68, or any geofence 64 surrounding an area rather than just a road or a section of road may indicate that the whole area should be avoided. The geofence 64 surrounding an area, as opposed to a single road or a section of a single road, such as the geofence 68, may be created when multiple roads in close proximity contain clusters that meet the threshold for generating a geofence 64. For example, the geofence 68 may indicate an entire neighborhood with a large quantity of roads merged together as an area that should be avoided. The model generating system 10 may use fuzzy logic, or a variation or fuzzy logic, to assess clusters and determine whether certain clusters may be merged together to form an area, as some roads or stretches of roads may contribute to multiple areas or overlapping geofences 64.

Particular geofences 64 may include sections of a highway road, such as a geofence 70, or smaller roads surrounding the highway, such as the geofence 68. When the model 60 is used for proactive route planning or active travel guidance while driving, only geofences 64 along roads actually being traveled may trigger the notification. For example, if a user of the model 60 is traveling along the highway near the geofence 68, a notification may not be produced as the geofence 68 only surrounds smaller roads near the highway that are not being traveled. As a further example, if a user of the model 60 is traveling on smaller roads around or under the geofence 70, a notification may not be produced as the geofence 70 only surrounds a section of road on the highway that is not being traveled.

The model generating system 10 may determine a score 72 associated with each generated geofence 64. The score 72 associated with each geofence 64 may indicate a recommendation to avoid the geofence 64, a number of prior accidents in the geofence 64, and/or an accident probability within the geofence 64 or along the roads included in the geofence 64 in the case of a geofenced area including more than one road. The scores 72 may be based on the historical accident data 30, the real-time and/or historical traffic data 44, the road condition data 46, and/or the weather condition data 48. As previously discussed, certain data inputs 28 may be weighted higher by the model generating system 10 in determining the score 72 for each geofence 64. As in the illustrated embodiment, the scores 72 may be indicated on the model 60 as a number or a number out of a total (e.g., 9/10) that may indicate a severity level or a quantity of factors present within the particular geofence 64. For example, a score 72 of 9/10 may indicate that 9 out of 10 factors suggest the geofence 64 should be avoided are present in the associated geofence 64. However, in some embodiments, the scores 72 may be indicative of a probability of a driver getting into an accident if driving within the associated geofence 64. Additionally or alternatively, each score 72 may be a variety of colors that may help indicate the score 72 to the user. For example, the score 72 may be shown in red when the score 72 is relatively high, and may be shown in yellow when the score 72 is relatively lower. In addition or as an alternative to a numerical score 72, the score may be indicated by emphasizing (e.g., via color or bold lines) certain road sections or groups of roads on the model 60. For example, a road section in a red color may indicate a relatively higher score, while a road section in a yellow color may indicate a relatively lower score.

As noted above, the geofences 64 may be activated only at certain times of day. Additionally or alternatively, the score 72 associated with each geofence 64 may vary throughout the time the geofence 64 is active. For example, a particular geofence 64 may remain active throughout a majority of the day; however, the score 72 associated with that geofence 64 may vary throughout the active period to reflect the varying factors present at specific times during the activation period. Changes in the score 72 throughout active periods of the geofence 64 may be indicated by a change in the number, color, and/or other indication of the score 72 associated with the geofence 64.

Further, as previously discussed, the model 60 may be continuously or periodically updated as new historical accident data 30 and other data inputs 28 are received. As such, the location and activation times of the geofences 64, as well as the scores 72 associated with the geofences 64, may be updated when new data inputs are received. Each time the geofences 64 and the associated scores 72 are updated by the model generating system 10, the model generating system 10 may prune, or eliminate, the relatively older accident data from the evaluation. Updating the geofences 64 and the scores 72 may enable generation of the model 60 that reflects current areas that should be avoided. For example, older accidents or multiple same-day incidences may raise the score of a road or an area temporarily. Additionally, road conditions may have been temporarily altered or may have been improved, and, in some instances, drivers may have learned to avoid particular previous roads or areas, thus lowering the traffic and accident occurrence in that area.

The model 60 may be the output of the model generating system 10 and may be used by the model generating system 10 and/or a route planning system to guide or actively notify users of areas that should be avoided. FIG. 3 is a block diagram of a portion of the system 8 having a route planning system 80 communicatively coupled to a variety of data sources that may assist the route planning system 80 in guiding or notifying a user based at least in part of the model 60. The route planning system 80 may include any suitable computing system (e.g., cloud computing system) and/or may include any suitable computer device, such as a general-purpose personal computer, a laptop computer, a tablet computer, a mobile computer, and the like that is configured in accordance with present embodiments. For example, the route planning system 80 may include a communication component 82, a processor 84, a memory 86, a storage 88, input/output (I/O) ports 90, a display 92, and the like. In some embodiments, as in the illustrated embodiment, the model generating system 10 and the route planning system 80 may be the same computing system. Therefore, in such embodiments, the communication component 82, the processor 84, the memory 86, the storage 88, the input/output (I/O) ports 90, and the display 92 may be the same as the communication component 12, the processor 14, the memory 16, the storage 18, the input/output (I/O) ports 20, and the display 22. However, in other embodiments, the model generating system 10 and the route planning system 80 may be separate computing systems and may be communicatively coupled, either directly or indirectly through the network 24.

The communication component 82 may facilitate wired or wireless communication between the route planning system 80, the data sources, and various other computing systems via the network 24. The processor 84 may be any type of computer processor or microprocessor capable of executing computer-executable code or logic. The processor 84 may also include multiple processors that may perform the operations described below.

The memory 86 and the storage 88 may be any suitable articles of manufacture that can serve as media to store processor-executable code, data, or the like. These articles of manufacture may represent non-transitory computer-readable media (e.g., any suitable form of memory or storage) that may store the processor-executable code or logic used by the processor 84 to perform the presently disclosed techniques. It should be noted that non-transitory merely indicates that the media is tangible and not a signal. As used herein, applications may include any suitable computer software or program that may be installed onto the route planning system 80 and executed by the processor 84.

The I/O ports 90 may be interfaces that may couple to other peripheral components, such as input devices (e.g., keyboard, mouse), sensors, input/output (I/O) modules, and the like. The display 92 may operate as a human machine interface (HMI) to depict visualizations associated with software or executable code being processed by the processor 84. The display 92 may be any suitable type of display, such as a liquid crystal display (LCD), plasma display, or an organic light emitting diode (OLED) display, for example. Additionally, in one embodiment, the display 92 may be provided in conjunction with a touch-sensitive mechanism (e.g., a touch screen) that may function as part of a control interface for the route planning system 80. It should be noted that the components described above with regard to the route planning system 80 are examples and the route planning system 80 may include additional or fewer components relative to the illustrated embodiment.

In some embodiments, the route planning system 80 may be communicatively coupled to the network 24. The network 24 may facilitate communication between the route planning system 80 and various other data sources. For instance, the network 24 may communicatively couple a user mobile device 94, the database 26, and the route planning system

80. Communication between the user mobile device 94 and the route planning system 80 may enable a user to proactively plan travel to avoid certain areas and/or enable the user to be notified of and/or reroute travel to avoid certain areas encountered during travel. The user mobile device 94 may be any device that may display the model 60 or other notifications generated by the route planning system 80, such as a mobile phone, tablet, vehicle guidance or entertainment system, or the like.

For proactive route planning, the route planning system 80 may receive a destination and time of travel from the user mobile device 94. In some embodiments, the route planning system 80 may determine a typical route used to access the destination. However, in some embodiments, the route planning system 80 may be communicatively coupled to another system or service that may provide an initial route to the destination. The route planning system 80 may overlay the route with the model 60 and may cause display of the route and the model 60 to the user via the user mobile device 94. Based on the expected travel times and/or traffic data 44, the route planning system 80 may then compare the given route with the model 60 to determine whether parts of the route cross into any areas that should be avoided (e.g., the geofences 64). The route planning system 80 may then use user preferences and/or filters to determine an alternate route to the destination that avoids some or all of the areas that should be avoided. For example, if the route planning system 80 determines that the route will pass through one or more geofences 64 of the model 60, the route planning system 80 may prompt the user via the user mobile device 94 with preferences for rerouting to the alternate route. In some embodiments, the route planning system 80 may enable the user to manually adjust the route.

The user preferences may enable the route planning system 80 to determine an alternate route to the destination without adversely affecting the user's travel in other ways. For example, in some embodiments, the user preferences may include preferences for a maximum extra mileage that may be added to provide the alternate route, a maximum extra time that may be added to provide the alternate route, and/or a preference for only rerouting around geofences 64 with scores higher than a certain number or level (e.g., higher than higher than 6/10, higher than 7/10, higher than 8/10). In some embodiments, the route planning system 80 may enable the user to select certain areas of the route or certain geofences 64 to avoid. Using the selected user preferences, the route planning system 80 may determine a new route and may return new directions to the user via the user mobile device 94. The user preferences may be stored on the user mobile device 94 and/or in the database 26.

The route planning system 80 may determine a respective total score for the route and the alternate route, which may be a sum of the scores of each geofence 64 traveled through, a number of geofences 64 traveled through, or the like. Based on the total score for the route and the total score for the alternate route, in some embodiments, the route planning system 80 may determine an approximated differential (e.g., score differential or probability differential) between the new route and the previous route, and may cause the approximate differential to be displayed via the user mobile device 94. Time information (e.g., a time to complete the route, a time to complete the alternate route, or a difference thereof) and/or distance information (e.g., a distance of the route, a distance of the alternate route, and/or a difference thereof) may also be determined and displayed via the user mobile device 94.

Additionally or alternatively, the route planning system 80 may use system filters for limiting the amount of recalculations used to determine the new route. For example, the route planning system 80 may address each geofence 64 along the route in order, such that the first geofence 64 that would be encountered along the route is addressed first. Thus, the route is modified to avoid the first geofence 64. However, after the first geofence 64 is avoided or bypassed, the new route may also avoid other geofences 64 downstream. As another example, the route planning system 80 may generate the new route that includes a minimum number of geofences 64. Further, the route planning system 80 may accept a minimal increase to some geofences 64 with relatively low scores along the route to lower the total score of the new route. For example, the route planning system 80 may reroute through a single geofence 64 having a moderate score, instead of multiple geofences 64 having a low score, which may generate a greater approximate differential between the route and the new route (e.g., alternate route). In this way, the disclosed techniques may improve efficiency of computer and system operations.

For active guidance and notification during travel, the route planning system 80 may receive a current location of the user and may determine a direction of travel of the user. For example, the route planning system 80 may receive a current location of the user and the user's vehicle via the user mobile device 94 (e.g., from a global positioning system [GPS] of the user mobile device 94). Based on the location and determined direction of travel, the route planning system 80 utilizes the model 60 to determine whether the user is currently within a geofence 64 and/or whether the user's projected path will intersect a geofence 64. The user mobile device 94 may query the route planning system 80 for the geofences 64 and scores 72 within a radius of the user location or within a cone of travel (e.g., forward of the vehicle). The route planning system 80 may notify the user if they are about to enter a geofence 64 and/or when the user is currently in a geofence 64. The notification may also include an indication of how long the geofence 64 extends. The notification may be a visual or audible alarm, or other indication. Further, in some embodiments, the route planning system 80 may suggest detours around the geofences 64 that the user is about to enter, if there is a detour available. The route planning system 80 may enable certain user preferences for notifications and detours similar to the user preferences discussed above, and including preferences for the notifications, such as only providing notifications for areas above a certain score (e.g., based on the score 72 of the geofence 64).

To reduce the number of queries to and/or calculations by the route planning system 80, the route planning system 80 may determine if there are any geofences 64 defining areas that should be avoided within a certain amount of miles (e.g., the radius) of the user's location. If so, the route planning system 80 may track the user's direction of travel and provide a notification to the user via the user mobile device 94. If the user exits the current radius, the query may be updated for geofences 64 within the new radius. In some embodiments, the route planning system 80 may cross-reference the geofences 64 within the current radius with the activation time (e.g., approximate time of day when the score 72 associated with the geofence 64 is high or above a threshold). If the current time is close to the activation time for the geofence 64, the route planning system 80 may provide a notification to the user. The route planning system 80 may disregard geofences 64 within the radius that are not currently active or are not close to their activation time.

Further, as previously discussed, if the user is on or near a highway, the route planning system 80 may determine whether the user is on the highway or not (e.g., based on location and/or speed of travel) and may only provide a notification for the geofence 64 on the highway if the user is determined to be on the highway, and vice versa. Therefore, the route planning system 80 may only provide notifications or new routes for geofences 64 along roads actually being traveled by the user. In this way, the disclosed techniques may improve efficiency of computer and system operations.

The user preferences may be stored on the user mobile device 94 and/or in the database 26. The system filters may be stored on the database 26 and/or the memory 86 of the route planning system 80. The model 60, including the data regarding the clusters, the geofences 64, and the scores 72, may be stored in the database 26. The model 60 may be pulled from the database 26 when a user destination and time of travel is received, or when travel is detected. The user mobile device 94 may query for the geofences 64 along the route or within a certain radius of the user's current location. When the user mobile device 94 reaches the boundary of the radius, the user mobile device 94 may query for the next set of geofences 64 within the next radius or along the new route. However, in some embodiments, frequently traveled areas that should be avoided (e.g., active geofences 64) may be stored on the user mobile device 94 until the user mobile device 94 is able to refresh the model 60 from the route planning system 80. This may enable users to be aware of frequently traveled areas that should be avoided even when the user is not currently connected to the route planning system 80. In some embodiments, the route planning system 80 may monitor whether users follow the provided alternate routes or detours, which may enable the route planning system 80 to adjust the filters of the route planning system 80.

Figure 4:
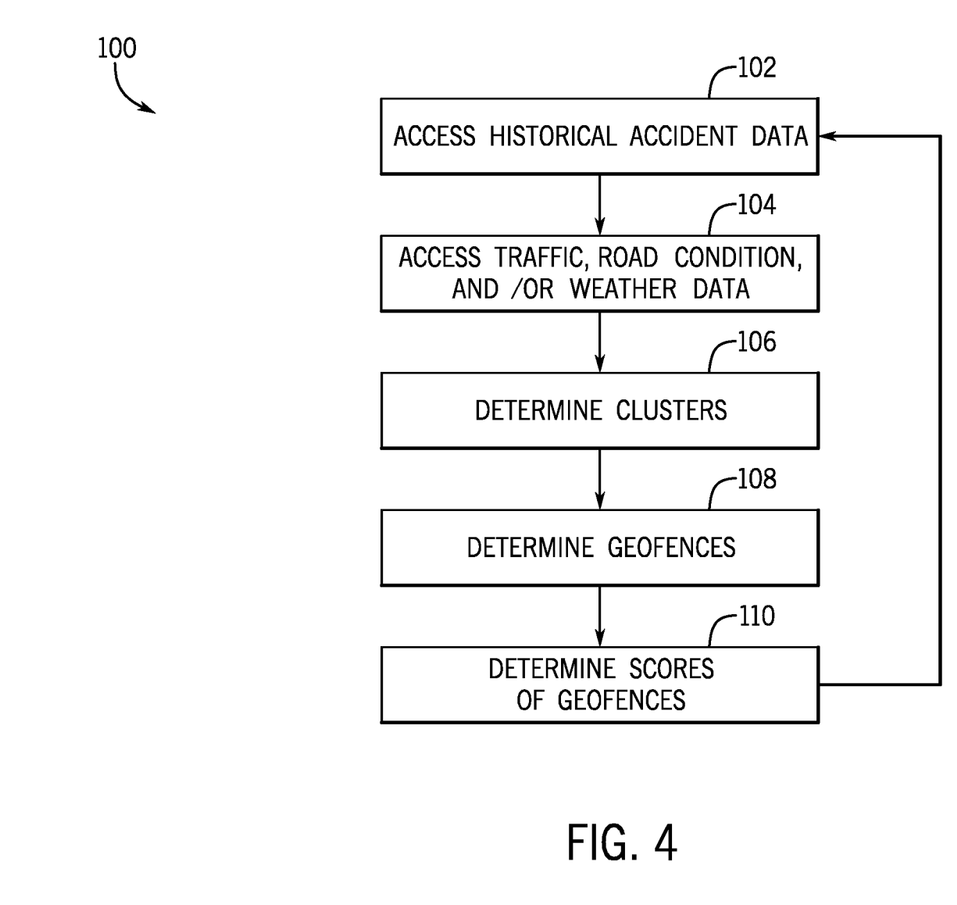
FIG. 4 illustrates a flow chart of a method for generating the model of FIG. 2, in accordance with embodiments described herein.

FIG. 4 illustrates a flow chart of a method 100 for generating the model 60 via the model generating system 10. Although the method 100 is described in a particular order, it should be noted that the method 100 may be performed in any suitable order and is not limited to the order presented herein. Further, certain steps of the method 100 may be omitted and/or other steps may be added. It should also be noted that although most of the blocks are described below in the method 100 as being performed by the model generating system 10, other suitable computing systems may perform some or all of the steps of the method 100 described herein.

At block 102, the model generating system 10 may access the historical accident data 30 from the database 26, such as the data regarding the accident location 32, the time of accident 34, the date of accident 36, the severity of accident 38, the cause of accident 40, and/or the characteristics of the driver or vehicle 42. Next, at block 104, the model generating system 10 may access other data inputs 28, such as the real-time or historical traffic data 44, the road condition data 46, and/or the weather condition data 48. Next, at block 106, the model generating system 10 may determine the clusters. The model generating system 10 may plot the accident locations on the model 60. The accident locations may be cluster points that are used to identify or generate the clusters.

Next, at block 108, the model generating system 10 may determine the geofences 64. The model generating system 10 may determine which clusters meet or exceed the threshold for generating a geofence 64. The threshold may be a particular number or density of vehicular accidents within a particular distance of road (e.g., within a half mile, within a mile, an intersection). Further, the model generating system 10 may take into account the relative age of the accidents within that cluster (e.g., apply varying weights based on age or only consider accidents within a recent time window). If the cluster meets or exceeds the threshold, the model generating system 10 may generate the geofence 64 at that location (e.g., encompassing the cluster) on the model 60. Further, as previously discussed, the model generating system 10 may determine and generate a geofence 64 area by merging multiple clusters in close proximity that meet or exceed the threshold. Additionally, the model generating system may determine the activation time or period for each generated geofence 64 indicating the approximate time of day when the score 72 associated with the geofence 64 is high or exceeds a threshold. As such, the active geofences 64 present on the model 60 may change throughout the day.

Next, at block 110, the model generating system 10 may determine the scores 72 associated with each of the generated geofences 64. The score 72 associated with each geofence 64 may indicate an accident probability within the geofence 64 or along the roads included in the geofence 64 in the case of a geofenced area including more than one road. The scores 72 may be based on the historical accident data 30, the real-time and/or historical traffic data 44, the road condition data 46, and/or the weather condition data 48. As previously discussed, certain data inputs 28 may be weighted higher by the model generating system 10 in determining the score 72 for each geofence 64. The scores 72 for each geofence 64 may be added to the model 60. Additionally, as previously discussed, the scores 72 may vary throughout the activation period of each geofence 64, and thus, may change throughout the day, even while the geofence 64 is active. The model generating system 10 may continuously or periodically receive the data inputs 28 from the database 26, or other data sources, and may update the model 60 to maintain up-to-date clusters, geofences 64, and scores 72 to accurately notify users of areas that should be avoided.

The model 60 generated by the model generating system 10 using the method 100 may be utilized by the route planning system 80 to proactively reroute the user to avoid certain areas and/or actively during travel to notify users of certain areas that should be avoided, as discussed in greater detail with reference to FIGS. 5 and 6. It should be understood that the model generating system 10 and the route planning system 80 may be the same computing systems or different computing systems.

Figure 5:
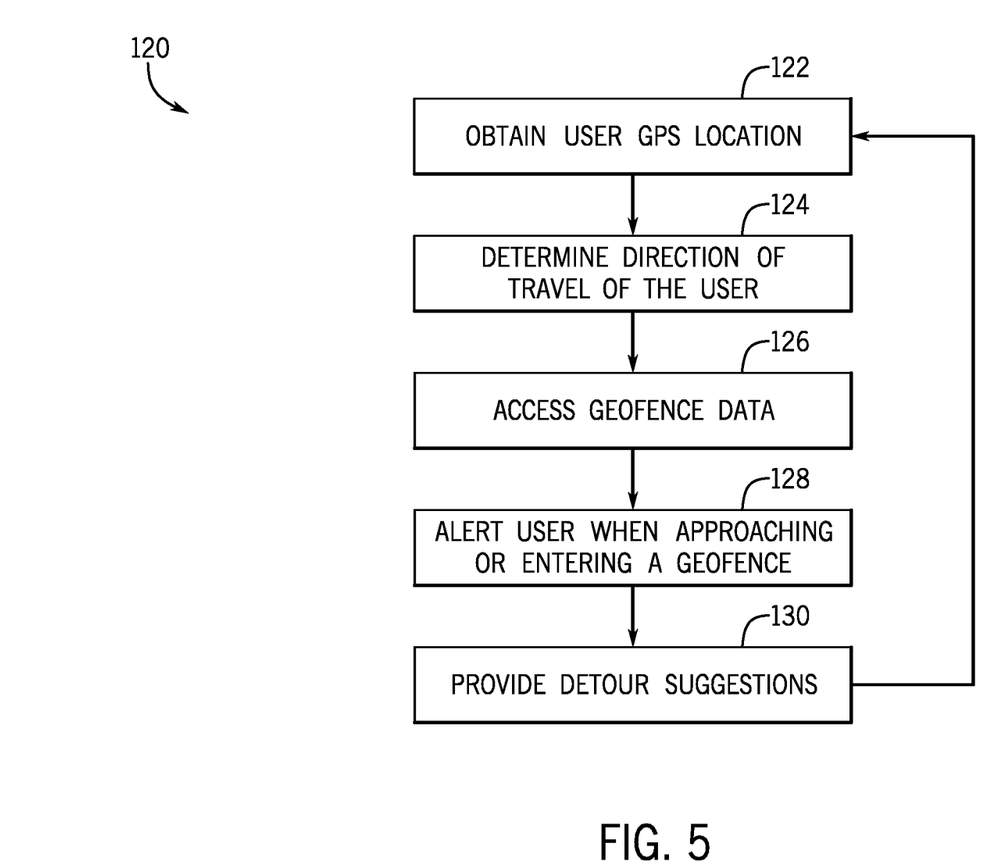
FIG. 5 illustrates a flow chart of a method for using the model of FIG. 2 while traveling in a vehicle, in accordance with embodiments described herein.

FIG. 5 illustrates a flow chart of a method 120 for using the model 60 to actively notify the user of active geofences 64 encountered or soon to be encountered during travel. Although the method 120 is described in a particular order, it should be noted that the method 120 may be performed in any suitable order and is not limited to the order presented herein. Further, certain steps of the method 120 may be omitted and/or other steps may be added. It should also be noted that although most of the blocks are described below in the method 120 as being performed by the route planning system 80, other suitable computing systems may perform some or all of the steps of the method 120 described herein.

Referring now to FIG. 5, at block 122, the route planning system 80 may obtain the GPS location of the user (e.g., via the user mobile device 94). Next, at block 124, based on the GPS location data, the route planning system 80 may determine the direction of travel of the user. Next, at block 126, the route planning system 80 may access the geofence data of the model 60 (e.g., from the database 26 or the model generating system 10). The route planning system 80 may receive a query from the user mobile device 94 for the data regarding the geofences 64 within a radius around the location of the user. Once the user has exited that radius, the user mobile device 94 may query the route planning system 80 for the geofences 64 within the next radius.

Next, at block 128, the route planning system 80 may notify the user when the user is approaching a geofence 64 and/or entering a geofence 64. The route planning system 80 may determine if the user is approaching or entering a geofence 64 based at least in part of the location data and the determined direction of travel. The route planning system 80 may provide the notification, either audible, visual, or both, when the user approaching the geofence 64 and/or when the user enters the geofence 64. Such notification may enable the user to be on alert that the current area is within an active geofence 64. In some embodiments, the route planning system 80 may enable user preferences that allow the user to select for notifications to be provided only for geofences 64 having relatively high scores 72 (e.g., above a threshold). Next, in some embodiments, the route planning system 80 may provide detour suggestions to navigate around the geofence 64 that the user is approaching or entering. The route planning system 80 may repeat the method 120 to notify the user of approaching geofences 64 while the route planning system 80 is in use.

Figure 6:
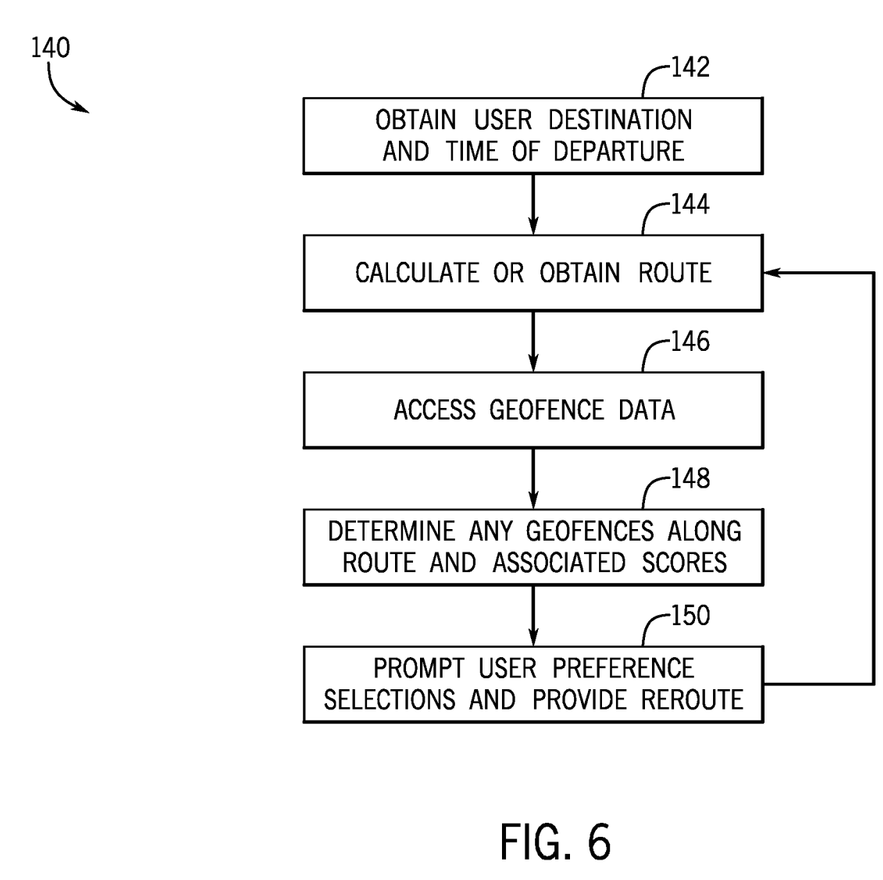
FIG. 6 illustrates a flow chart of another method for using the model of FIG. 2 during route planning, in accordance with embodiments described herein.

FIG. 6 illustrates a flowchart of a method 140 for using the model 60 to proactively plan a travel route to avoid certain geofences 64. Although the method 140 is described in a particular order, it should be noted that the method 140 may be performed in any suitable order and is not limited to the order presented herein. Further, certain steps of the method 140 may be omitted and/or other steps may be added. It should also be noted that although most of the blocks are described below in the method 140 as being performed by the route planning system 80, other suitable computing systems may perform some or all of the steps of the method 140 described herein. Further, is should be understood that the methods 100, 120, and/or 140 may be performed together (e.g., prior to and/or during a driving trip).

At block 142, the route planning system 80 may obtain the destination and/or the estimated time of departure from the user (e.g., via the user mobile device 94). Next, at block 144, the route planning system 80 may calculate or obtain a typical route (e.g., fastest route, which may be based on current traffic or road condition data, for example) to the given destination. Next, at block 146, the route planning system 80 may access the data regarding the geofences 64 of the model 60 (e.g., from the database 26 or the model generating system 10). The route planning system 80 may overlay the route on the model 60. Next, at block 148, the route planning system 80 may identify whether any geofences 64 exist along the route to the given destination based on the model 60 and/or active geofences 64 at the estimated time of departure and travel.

Next, at block 150, the route planning system 80 may receive user preference selections (e.g., via the user mobile device 94) and may determine and provide a new route (e.g., reroute, alternate route) to the given destination (e.g., based at least in part on the user preferences selected). The user preferences may enable the route planning system 80 to determine a new route to the destination without adversely affecting the user's travel in other ways, as discussed above. The route planning system 80 may determine a new route to the destination, may provide the new route and, in some embodiments, may provide the route directions via a display (e.g., via a display of the user mobile device 94). The route planning system 80 may further provide the approximate differential between the route and the new route based at least in part on the total scores of each route.

The technical effects of the systems and methods described herein include utilizing historical accident data, and other traffic, road condition, and/or weather condition data to generate a model that may enable the system to provide a route and/or notify a user of areas that should be avoided. The model may indicate such areas with geofences and/or associated scores. The activation of geofences and/or the associated scores may vary throughout the day. Further, the model, including the geofences and/or the scores, may be updated to remain up-to-date based on updated accident and other data received from the database and/or other data sources. The model, the geofences, and/or the scores may enable proactive avoidance of certain areas through route planning, as well as active avoidance and/or notification triggered by approaching geofences or reaching geofences. Thus, the model may reduce a travel time to a destination by avoiding accident-prone areas and/or an increase in awareness of areas within which accidents have previously occurred. Furthermore, it should be appreciated that the disclosed techniques may improve efficiency of computer and system operations in various ways.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine-readable instructions that, when executed by one or more processors, cause the one or more processors to:

receive a plurality of data inputs from one or more databases, wherein the plurality of data inputs comprises historical accident data indicative of prior accidents;

determine a plurality of geofences based at least in part on the plurality of data inputs, wherein each geofence of the plurality of geofences surrounds a respective cluster of the prior accidents;

determine a plurality of scores based at least in part on the plurality of data inputs, wherein each score of the plurality of scores is associated with a geofence of the plurality of geofences;

generate a model comprising the plurality of geofences and the plurality of scores;

receive a plurality of user inputs, wherein the plurality of user inputs comprises a starting location, a destination location, and a user preference;

determine a fastest driving route from the starting location to the destination location;

compare the fastest driving route to the model comprising the plurality of geofences and the plurality of scores; and in response to determining that the fastest driving route passes through one or more of the plurality of geofences, determine an alternate route that avoids at least one of the one or more of the plurality of geofences and that corresponds to the user preference.

2. The tangible, non-transitory machine-readable medium of claim 1, wherein the plurality of data inputs comprises traffic data, road condition data, weather data, or any combination thereof.

3. The tangible, non-transitory machine-readable medium of claim 1, wherein the machine-readable instructions, when executed by the one or more processors, cause the one or more processors to:
identify a plurality of clusters of the prior accidents;
compare a respective density of each cluster of the plurality of clusters to a threshold density; and
determine the plurality of geofences such that each geofence of the plurality of geofences surrounds the respective cluster having the respective density that exceeds the threshold density.

4. The tangible, non-transitory machine-readable medium of claim 1, wherein each geofence of the plurality of geofences comprises a section of a road or an area comprising multiple sections of multiple roads.

5. The tangible, non-transitory machine-readable medium of claim 1, wherein the machine-readable instructions, when executed by the one or more processors, cause the one or more processors to update the model based on new data inputs, age of the plurality of data inputs, or a combination thereof.

6. The tangible, non-transitory machine-readable medium of claim 1, wherein each of the plurality of scores indicates an accident probability associated with each geofence of the plurality of geofences.

7. The tangible, non-transitory machine-readable medium of claim 1, wherein the machine-readable instructions, when executed by the one or more processors, cause the one or more processors to output a notification to a driver when a vehicle is approaching one of the geofences of the plurality of geofences, entering one of the geofences of the plurality of geofences, or a combination thereof.

8. The tangible, non-transitory machine-readable medium of claim 1, wherein the user is a driver of the vehicle, and the preference comprises a preference related to avoidance of the plurality of geofences.

9. The tangible, non-transitory machine-readable medium of claim 1, wherein the user preference comprises a maximum time difference between the fastest driving route and the alternate route.

10. The tangible, non-transitory machine-readable medium of claim 1, wherein the user preference comprises a maximum mileage difference between the fastest driving route and the alternate route.

11. The tangible, non-transitory machine-readable medium of claim 1, wherein the user preference comprises a preference to only avoid the one or more of the plurality of geofences that have a respective score above a threshold score.

12. A tangible, non-transitory machine-readable medium comprising machine-readable instructions that, when executed by one or more processors, cause the one or more processors to:
receive historical accident data indicative of prior accidents;
determine a plurality of geofences based at least in part on the historical accident data, wherein each geofence of the plurality of geofences surrounds a respective cluster of the prior accidents;
generate a model comprising the plurality of geofences;
receive a starting location, a destination location, and a user preference;
determine a fastest driving route from the starting location to the destination location;
compare the fastest driving route to the model comprising the plurality of geofences;
in response to determining that the fastest driving route passes through one or more of the plurality of geofences, determine an alternate route that avoids at least one of the one or more of the plurality of geofences and that corresponds to the user preference.

13. The tangible, non-transitory machine-readable medium of claim 12, wherein the machine-readable instructions, when executed by the one or more processors, cause the one or more processors to determine a plurality of scores based at least in part on the historical accident data, wherein each score of the plurality of scores is associated with and indicates an accident probability within a respective geofence of the plurality of geofences.

14. The tangible, non-transitory machine-readable medium of claim 12, wherein the machine-readable instructions, when executed by the one or more processors, cause the one or more processors to:
identify a plurality of clusters of the prior accidents;
compare a respective density of each cluster of the plurality of clusters to a threshold density; and
determine the plurality of geofences such that each geofence of the plurality of geofences surrounds the respective cluster having the respective density that exceeds the threshold density.

15. The tangible, non-transitory machine-readable medium of claim 12, wherein each geofence of the plurality of geofences comprises a section of a road or an area comprising multiple sections of multiple roads.

16. A method, comprising:
receiving, at one or more processors, historical accident data indicative of prior accidents;
determining, using the one or more processors, a plurality of geofences based at least in part on the historical accident data such that each geofence of the plurality of geofences surrounds a respective cluster of the prior accidents;
generating, using the one or more processors, a model comprising the plurality of geofences;
receiving, at the one or more processors, a starting location, a destination location, and a user preference related to avoidance of the plurality of geofences; and
determining, using the one or more processors, a driving route that avoids at least one of the plurality of geofences and that corresponds to the user preference.

17. The method of claim 16, comprising determining a plurality of scores based at least in part on the historical accident data using the one or more processors, wherein each score of the plurality of scores is associated with and indicates an accident probability within a respective geofence of the plurality of geofences.

18. The method of claim 17, wherein the preference comprises a preference to only avoid certain geofences of the plurality of geofences that have a respective score above a threshold score.

19. The method of claim 16, comprising:
identifying a plurality of clusters of the prior accidents, using the one or more processors;
comparing a respective density of each cluster of the plurality of clusters to a threshold density, using the one or more processors; and
determining the plurality of geofences such that each geofence of the plurality of geofences surrounds the respective cluster having the respective density that exceeds the threshold density, using the one or more processors.

20. The method of claim 16, outputting a notification to a driver in response to a vehicle is approaching one of the geofences of the plurality of geofences, entering one of the geofences of the plurality of geofences, or a combination thereof, using the one or more processors.

\* \* \* \* \*